United States Patent [19]

Kobari et al.

[11] Patent Number: 5,225,992
[45] Date of Patent: Jul. 6, 1993

[54] COMPUTERIZED OVERCURRENT DETECTOR

[75] Inventors: Katsuo Kobari; Shinji Seki, both of Tokyo; Shunsuke Matsubara, Minamitsuru, all of Japan

[73] Assignee: Fanuc Ltd., Japan

[21] Appl. No.: 269,181

[22] PCT Filed: Feb. 19, 1988

[86] PCT No.: PCT/JP88/00172

§ 371 Date: Aug. 24, 1989

§ 102(e) Date: Aug. 24, 1989

[30] Foreign Application Priority Data

Feb. 19, 1987 [JP] Japan ............................ 62-034449

[51] Int. Cl.$^5$ ............................................. H02H 7/00
[52] U.S. Cl. .................................. 364/483; 364/557; 361/24
[58] Field of Search ................ 364/483, 557, 482; 361/24, 25; 374/57, 152

[56] References Cited

U.S. PATENT DOCUMENTS

| | | | |
|---|---|---|---|
| 4,195,254 | 3/1980 | Gurwicz et al. | 361/24 X |
| 4,524,264 | 6/1985 | Takeuchi et al. | 364/482 |
| 4,525,763 | 6/1985 | Hardy et al. | 361/24 |
| 4,573,132 | 2/1986 | Boothman et al. | 361/24 X |
| 4,602,872 | 7/1986 | Emery et al. | 374/152 |
| 4,695,961 | 9/1987 | Arinobu | 364/483 |
| 4,760,379 | 7/1988 | De Phillipo et al. | 340/664 |
| 4,796,142 | 1/1989 | Libert | 364/483 X |
| 4,937,757 | 6/1990 | Dougherty | 364/483 X |
| 4,939,437 | 7/1990 | Farag et al. | 361/25 X |

FOREIGN PATENT DOCUMENTS 0332568 9/1989 European Pat. Off. ............. 361/24

Primary Examiner—Parshotam S. Lall
Assistant Examiner—Michael Zanelli
Attorney, Agent, or Firm—Staas & Halsey

[57] ABSTRACT

An overcurrent detector realized by using a computer. The apparatus is provided with an overcurrent detector (5) which calculates the temperature rise $\theta(n) = K_1 P(n) + K_2 \theta(n-1)$, based on a current (In) flowing in an electric machine, under the conditions that the machine has an electric resistance (r), the machine works in a known ambient temperature, the allowable temperature rise ($\theta(max)$) of the machine is known, a first coefficient ($K_1$) and a second coefficient ($K_2$) are predetermined. The overcurrent detector (5) further compares the temperature rise ($\theta(n)$) with a difference between the allowable temperature rise ($\theta(max)$) of the machine and the ambient temperature at which the machine is used, and determines that the machine is in an overcurrent position, when the former exceeds the latter.

5 Claims, 5 Drawing Sheets

COMPUTERIZED OVERCURRENT DETECTOR

TECHNICAL FIELD OF THE INVENTION

This invention relates to an overcurrent detector realized by employing a computer. More specifically, this invention relates to an overcurrent detector having various advantages such as simplicity in construction, improvement in sensitivity and accuracy, such advantages being realized without being accompanied by any economical disadvantage, in the cases where a protected machine inherently employs a computer e.g. an automatic machine tool controled by numerical control system or the like.

BACKGROUND OF THE INVENTION

Electromagnetic machines e.g. motors, generators or the like, require two independent types of overcurrent protection including the one against an excess electromagnetic force (a mechanical force) generated by an excess electric current flowing therein even during a short period and the other against an overheating caused by accumulation of heat generated by electric current flowing therein during a relatively long period even if the intensity of the electric current is relatively small.

A traditional means for the former is a moving iron type overcurrent relay which quickly reacts to an overcurrent, and a traditional means for the latter is an induction type overcurrent relay which has characteristics to integrate the results of the electric current flowing therein.

Development of automatic control systems applicable to electric machines e.g. development of a pulse width modulation system applicable to electric machines, has caused a tendency to design such overcurrent protection means by means of an analog or digital circuit system which is designed in one body with the aforementioned automatic control system of an electric machine, rather than by means of the aforementioned electromagnetic equipment.

Referring to FIG. 1, one example of such overcurrent protection means which employs an analog or digital circuit system will be described below. An electric current sensed by an electric current sensing means 6 is applied to an excess electric current sensing means 7 realized by employing a bistable multivibrator or the like e.g. a Schumit circuit or the like. An integration circuit 8 consisting of for example, an RC circuit exponentially accumulates the electric charge continuously applied by the excess electric current sensing means 7, in the capacitor thereof, and the quantity of electric charge stored therein exponentially increases during the period wherein the excess electric current sensing means 7 continues to output a signal. An alarm circuit 9 which is also a bistable multivibrator or the like e.g. a Schumit circuit or the like, continues to output an alarm signal during the period in which the output voltage of the integration circuit 8 exceeds a predetermined value.

Such an overcurrent detector as described above or an overcurrent detector consisting of analog or digital circuits for example, is remarkably advantageous, in the cases where the control circuits of electric machines to be protected also contain analog or digital circuits which are similar to those which are employed for the aforementioned overcurrent detector employing analog or digital circuits. This is because considerable parts of the automatic control circuits are allowed to be employed also for the circuits of the overcurrent detection.

However, if the control circuit of an electric machine is designed employing a computer, the aforementioned advantage can not be as large as was described above. This is because the aforementioned overcurrent detector alone is required to be designed employing plural discrete electronic elements for producing analog or digital circuits.

Therefore, the aforementioned tendency to produce the control circuit of electric machines by employing a computer has derived a desire to develope an overcurrent detector employing a computer.

SUMMARY OF THE INVENTION

An object of the present invention is to provide an overcurrent detector realized by employing a computer.

To achieve the aforementioned object, an overcurrent detector in accordance with this invention provides an overcurrent detector means (5) for calculating a temperature rise ($\theta(n)$) generated in an electric machine to be protected, during the sampling period of which the number is n, by employing a formula $$\theta(n) = K_1 P(n) + K_2 \theta(n-1)$$

wherein:

P(n) is the heat generated in the machine during the sampling period of which the number is n,
$K_1$ is a first coefficient, and
$K_2$ is a second coefficient, under the conditions that the resistance (r) of the machine, the ambient temperature at which the machine works, and the maximum allowable temperature rise ($\theta(max)$) of the machine are predetermined, and under the conditions that (In), the intensity of the electric current flowing in the machine is consecutively input, and for comparing the temperature rise ($\theta(n)$) with a difference between the maximum allowable temperature rise ($\theta(max)$) of the machine and the ambient temperature at which the machine works, and for determining an overcurrent position or condition of the machine, following an excess of the temperature rise ($\theta(n)$) beyond the difference between the maximum allowable temperature rise ($\theta(max)$) of the machine and the ambient temperature at which the machine works.

More specifically, an overcurrent detector in accordance with this invention is provided (a) an electric current sensing means (1) for sensing the intensity of the electric current (In) flowing in an electric machine to be protected on a sampling basis, (b) a first calculation means (2) for calculating the heat (P(n)) generated in the machine by the electric current (In), by multiplying the square of the electric current (In) by the resistance (r) of the machine, (c) a temperature rise memory means (3) for memorizing or storing the temperature rise ($\theta(n-1)$) of the machine generated during the sampling period immediately in advance of the period in which the above sampling is conducted, (d) a second calculation means (4) for calculating a temperature rise ($\theta(n)$) generated in the machine during the sampling period of which the number is n or in which the electric current (In) is sampled, by multiplying the heat (P(n)) generated in the machine during the sampling period, by a first coefficient ($K_1$), by multiplying the temperature rise ($\theta(n-1)$) of the machine generated during the sampling period immediately in advance of the period in which the sampling is conducted, by a second coefficient ($K_2$), and by accumulating these two figures, and for memorizing the calculated temperature rise ($\theta(n)$) in the temperature rise memory means (3), and (e) an overcurrent detector means (5) for detecting an overcurrent condition of the machine, based on an excess of the temperature rise ($\theta(n)$) beyond the difference between the maximum allowable temperature rise ($\theta(max)$) of the machine and the ambient temperature at which the machine works.

In the case where the aforementioned sampling period is not sufficiently short in comparison with the variation of the load current (In), it is effective to use an average $$\left( \frac{1}{M} \sum_{m=1}^{M} |Im| \right)$$

of the absolute value of the electric current (Im) picked up by means of a second sampling system having a shorter sampling period (a sampling system having a sampling period which is 1/m of the sampling period of the sampling system with which (In) is sensed).

The principle and the function of the overcurrent detector of this invention will be described below.

It is well-known that the temperature rise of an electric machine, such as a motor, a generator or the like is determined, based on the difference between the heat generated therein and which is calculated by multiplying the square of the electric current by the electric resistance r of the windings of the electric machine and the heat emitted the same period, and it exponentially rises.

Therefore, the temperature rise $\theta(n)$) can be calculated by employing a schematic electric circuit illustrated in FIG. 2. The result is:

$$\begin{aligned} \theta(n) &= P(n)r\left(1 - \exp\left(\frac{T}{Cr}\right)\right) + \\ &\quad \exp\left(\frac{T}{Cr}\right)\theta(n-1) \\ &= K_1 P(n) + K_2 \theta(n-1) \end{aligned}$$

wherein:
C is the heat capacity of an electric machine,
r is the electric resistance of the windings of the electric machine,
T is the sampling period, and
P(n) is the heat generated during a sampling period of which the number is n.

In other words, the overcurrent detector in accordance with this invention is realized by a computer whose function is:

a. A sampling system is employed to obtain the heat (P(n)) generated in the machine during each sampling period, b. A formula $$\theta(n) = K_1 P(n) + K_2 \theta(n-1)$$

is employed to calculate the temperature rise ($\theta(n)$) during a sampling period of which the number is n, c. The calculated temperature rise ($\theta(n)$) is memorized until the next sampling period finishes, d. Immediately after the next heat P(n+1) generated in the machine during the next sampling period is obtained, the aforementioned formula is repeatedly employed to calculate the temperature rise ($\theta(n+1)$) generated in the machine during the next sampling period, consecutively renewing the value memorized in the temperature rise memory means to the current value of the temperature rise of the electric machine, and e. As soon as the aforementioned temperature rise ($\theta(n)$) exceeds the maximum allowable temperature rise ($\theta(max)$) of the electric machine (or the temperature at which the machine is overheated less the ambient temperature), the electric machine is determined to be in an overcurrent condition.

The aforementioned overcurrent detector in accordance with this invention is involved with a drawback in which the reliability is unsatisfactory in the cases where the variation speed of the electric current flowing in the electric machine to be protected is too quick in comparison with the sampling speed. This drawback, however, can readily be removed by adding an additional feature of the present invention of installing another sampling means whose sampling period is shorter than the aforementioned sampling means. For example, in the case for protection of an alternative machine of 50 Hz, a sampling means having the sampling period equivalent to 50 Hz is evidently insignificant.

An exemplary means to avoid such unsatisfactory function is to employ an average current for some length of time rather than the aforementioned instantaneous value of the current. In other words, provided the electric current (Im) is sensed for example every one minute, a formula $$\frac{1}{100} \sum_{m=1}^{100} |Im|$$

wherein $|Im|$ is the absolute value of the current (Im), after for example 100 samplings finishes (or every 100 milli seconds), is used to calculate the average current (In).

Since $\theta(n)$ represents a temperature rise, the initial condition thereof ($\theta(O)$) is "0". Namely, $$\theta(1) = K_1 P(1), \text{ and}$$

$$\theta(2) = K_1 P(2) + K_2 K_1 P(1).$$

Since the value to be compared with such a value representing temperature rise must also be a temperature rise, the value which is compared with the aforementioned temperature rise ($\theta(n)$) by means of the overcurrent detector means (5) is the allowable maximum temperature rise $\theta(max)$ which is the difference between the temperature at which an electric machine is overheated and the ambient temperature.

However, provided the aforementioned initial condition is selected to be the ambient temperature, a temperature rather than a temperature rise can be calculated. In this case, a temperature rather than a temperature rise must be employed as a reference (a standard value to be compared with the temperature of an electric machine) for the overcurrent detector means (5).

DETAILED DESCRIPTION OF THE PREFERRED EMBODIMENTS

Referring to drawings, a more detailed description will be presented below for overcurrent detectors in accordance with two embodiments of this invention.

First Embodiment

Figure 1:
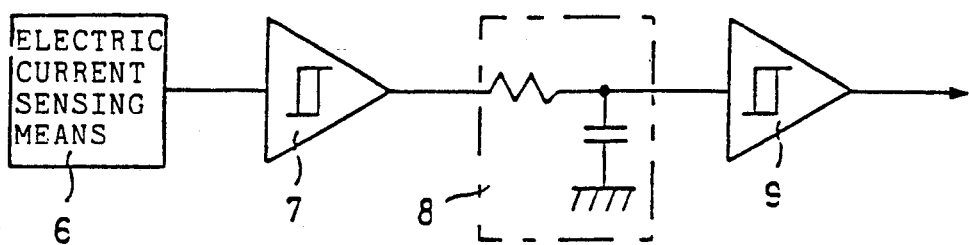
FIG. 1 is a block diagram of an overcurrent detector available in the prior art.
Figure 2:
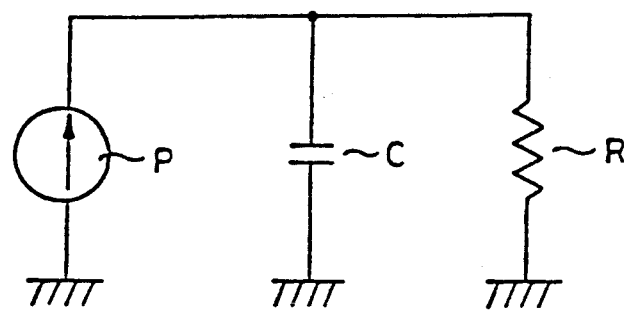
FIG. 2 is a schematic electric circuit employed as an equivalent circuit of an overcurrent detector in accordance with this invention.
Figure 3:
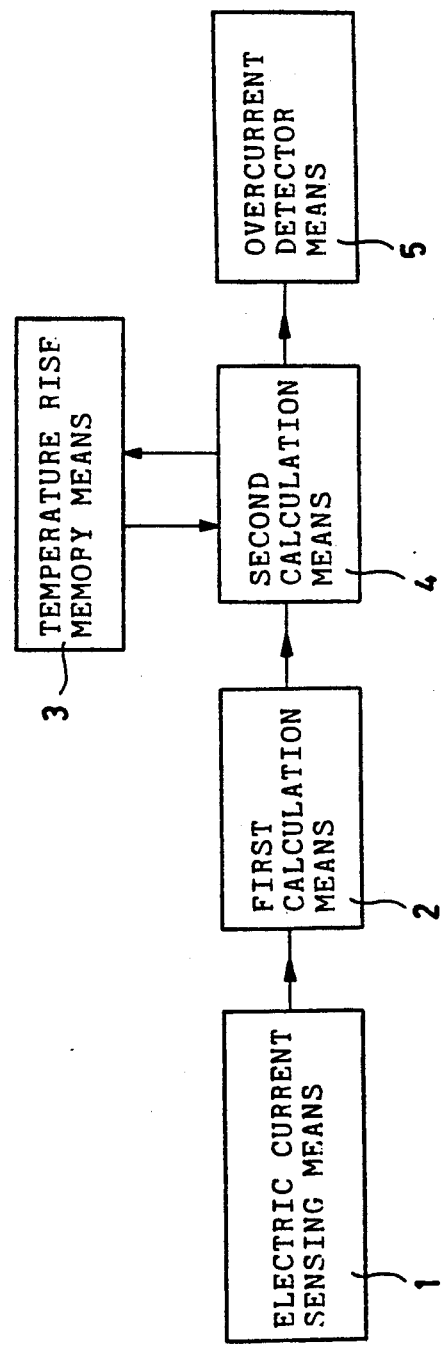
FIG. 3 is a block diagram illustrating each function element constituting an overcurrent detector in accordance with the first embodiment of this invention and the mutual relations thereof.

FIG. 3 is a block diagram illustrating each function element constituting an overcurrent detector in accordance with the first embodiment of this invention and the mutual relations thereof.

Referring to the drawing, numeral 1 is an electric current sensing means for sensing the electric current (In)flowing in an electric machine.

Numeral 2 is a first calculation means for calculating the heat P(n) generated by the electric current (In) flowing in an electric machine by multiplying the square of the sensed current In by the resistance r of the windings of the electric machine.

Numeral 3 is a temperature rise memory means for memorizing the temperature rise of the aforementioned electric machine $\theta(n-1)$ generated in the machine during the sampling period immediately in advance of the sampling period in which the aforementioned electric current In is sensed.

Numeral 4 is a second calculation means having the following sequential functions. Namely, whenever a sampling finishes, a calculation of $$\theta n = K_1 P(n) + K_2 \theta(n-1)$$

is conducted to obtain the temperature rise during which the sampling is conducted, and each result is memorized in the aforementioned temperature rise memory means 3 to renew the content thereof. In other words, the second calculation means 4 multiplies every newly sampled heat P(n) by the first coefficient $K_1$ and multiplies every temperature rise $\theta(n-1)$ generated during the immediately last sampling period by the second coefficient $K_2$, before adding these two figures to resultantly obtain the temperature rise $\theta(n)$ generated in the machine during the current sampling period, and being memorized in the aforementioned temperature rise memory means 3.

Numeral 5 is an overcurrent detector means for comparing the aforementioned temperature rise $\theta(n)$ calculated by the aforementioned second calculation means 4 with the maximum allowable temperature rise of the electric machine to be protected ($\theta(max)$)( which is calculated by subtracting the ambient temperature from the temperature at which the electric machine to be protected potentially incurrs damage by overheating) to determine an overcurrent condition of the machine based on the comparison.

Figure 4:
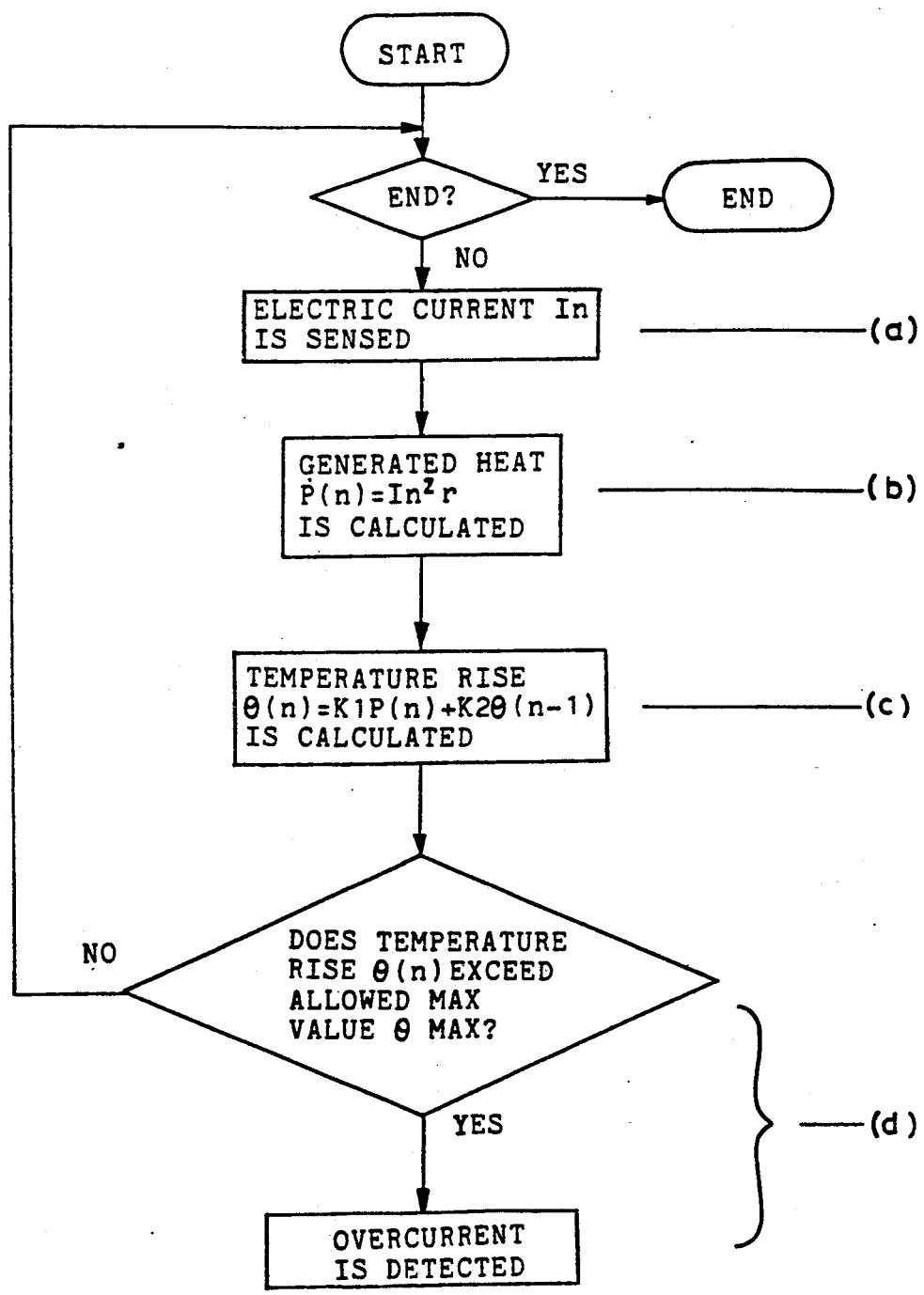
FIG. 4 is a flow chart illustrating the sequential operation of an overcurrent detector in accordance with the first embodiment of this invention.

Since it is realistic to realize the aforementioned overcurrent detector by employing a computer, the sequential operation thereof will be described below, referring to FIG. 4 which is a flow chart of a program for the overcurrent detector computer.

The electric current sensing means 1 senses the load current (In) of an electric machinery e.g. a motor, a generator, etc. for example every 1 milli second by means of a sampling system (a).

Immediately after every sampling is conducted, the first calculation means 2 calculates the heat P(n) generated by the electric current In, by multiplying the square of the electric current (In) sensed by the electric current sensing means 1 by the electric resistance r of the windings of the electric machine to be protected e.g. the motor, the generator or the like (b).

The second calculation means 4 conducts multiplication of the heat P(n) generated in the machine during the sampling period, by the first coefficient $K_1$ and multiplication of the temperature rise $\theta(n-1)$ of the electric machine to be protected, in the immediate proceeding sampling period by the second coefficient $K_2$, and adds these two figures to obtain $\theta(n)$, and the calculated $\theta(n)$ is memorized in the temperature rise memory means 3(c).

Every sampling action is followed by a comparison between the temperature rise $\theta(n)$ calculated by the second calculation means 4 and the maximum allowable temperature rise ($\theta(max)$)(which is calculated by subtracting the ambient temperature from the temperature which potentially causes damage by overheating), such comparison being conducted by the overcurrent detector means 5. Provided the temperature rise $\theta(n)$ calculated by the second calculation means 4 exceeds the maximum allowable temperature rise ($\theta(max)$), the overcurrent detector means 5 determines that the electric machine to be protected is in an overcurrent condition (d).

Second Embodiment

Figure 5:
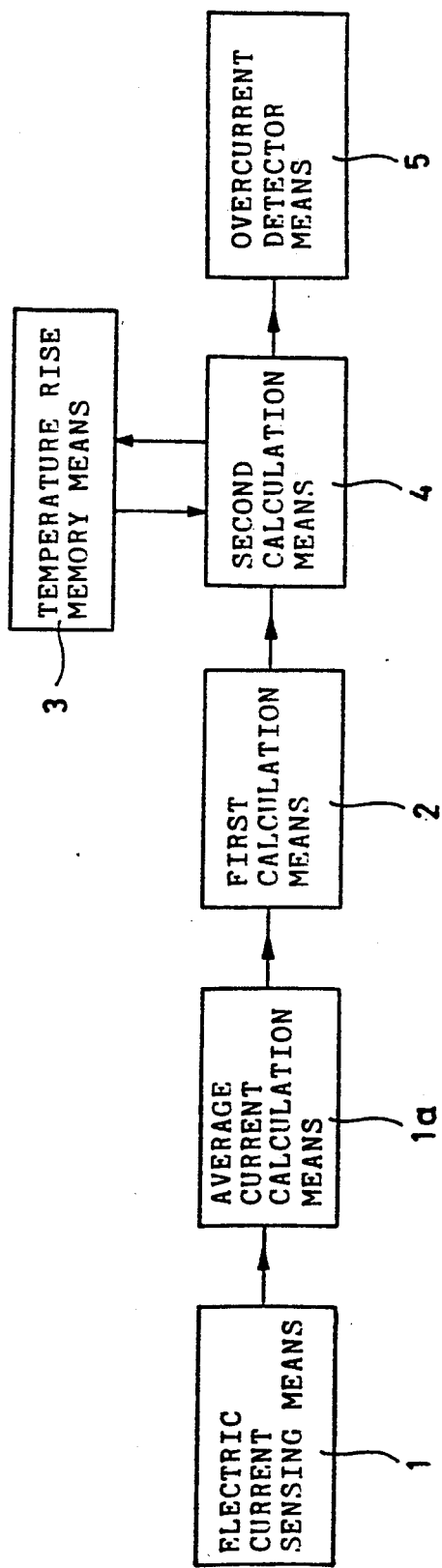
FIG. 5 is a block diagram illustrating each function element constituting an overcurrent detector in accordance with the second embodiment of this invention and the mutual relations thereof.

FIG. 5 is a block diagram illustrating each function element constituting an overcurrent detector in accordance with a second embodiment of this invention and the mutual relations thereof. This embodiment is a modification of the first embodiment, wherein another sampling means having a sampling period shorter than that of the first embodiment (hereinafter referred to as a cumulative sampling period) is installed between the electric current sensing means 1 and the first calculation means 2 for the purpose of obtaining the average current for the cumulative sampling period.

Referring to the drawing, numeral 1 is an electric current sensing means for sensing the electric current Im flowing in an electric machine.

Numeral 1a is an average current calculation means having a function to calculate the average current In for the cumulative sampling period, represented by:

$$In = \frac{1}{100} \sum_{m=1}^{100} |Im|$$

In other words, a plurality of the absolute value of the electric current flowing in an electric machine, which is sampled e.g. every 1 milli second, is accumulated e.g. every 100 samplings (or every 100 milli seconds), before the sum is divided by 100.

The reason why the absolute value of the sampled current (Im) or |Im| is employed is that the electric current (Im) flowing in an electric machine may not only be DC, but may also be AC in which the direction of the current is alternately reversed.

Numeral 2 is a first calculation means for calculating the heat P(n) generated by the average current (Im) which is calculated by the average current calculation means 1a, by multiplying the square of the aforementioned average current (Im) for the cumulative sampling period, by the resistance r of the windings of the machine to be protected.

Numeral 3 is a temperature rise memory means for memorizing the temperature rise of the aforementioned electric machine $\theta(n-1)$ generated in the machine during the immediately last cumulative sampling period.

Numeral 4 is a second calculation means having the following sequential functions. Namely, whenever an cumulative average current (In) is obtained, a calculation of $$\theta n = K_1 P(n) + K_2 \theta(n-1)$$

is conducted to obtain the temperature rise $\theta(n)$ generated during a period in which a cumulative sampling is conducted, and each result is memorized in the aforementioned temperature rise memory means 3 to renew the content of the aforementioned temperature rise memory means 3. In other words, the second calculation means 4 multiplies every calculated heat P(n) generated during every cumulative sampling period or during the period in which an average current (In) flows in the machine to be protected, by the first coefficient $K_1$, and multiplies every temperature rise $\theta(n-1)$ generated during the immediately last cumulative sampling period by the second coefficient $K_2$, before adding these two numbers to obtain the temperature rise $\theta(n)$ generated during every cumulative sampling period or during the period in which every average current (In) is determined to flow in the machine to be protected, and memorizing the resultant temperature rise $\theta(n)$ generated during a cumurative sampling period in the aforementioned temperature rise memory means 3.

Numeral 5 is an overcurrent detector means for comparing the aforementioned temperature rise $\theta(n)$ calculated by the aforementioned second calculation means 4 with the maximum allowable temperature rise $\theta(max)$ of the machine to be protected, and for detecting an overcurrent condition of the machine.

Figure 6:
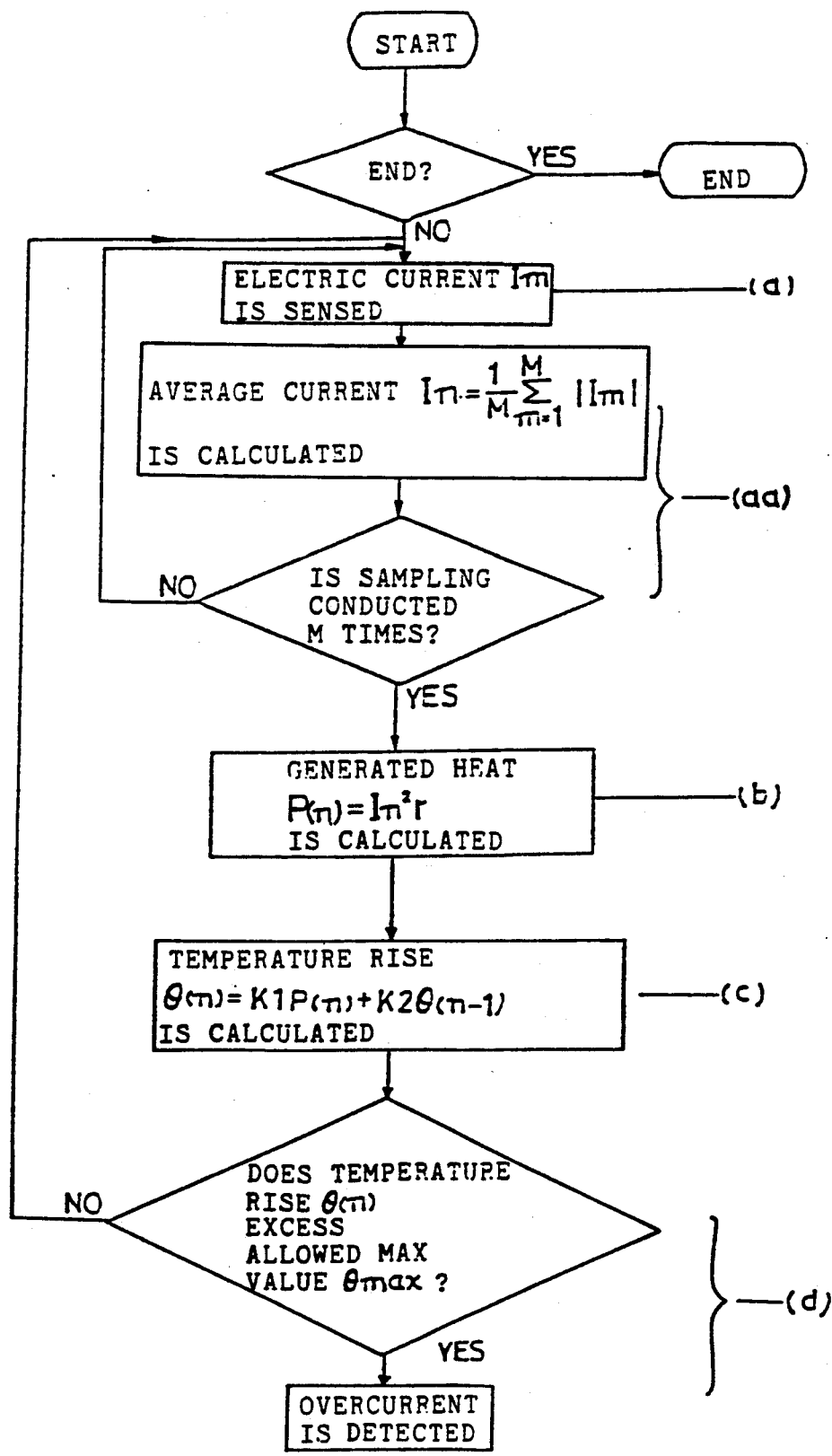
FIG. 6 is a flow chart illustrating the sequential operation of an overcurrent detector in accordance with the second embodiment of this invention.

Since it is practical to realize the aforementioned overcurrent detector by employing a computer, the sequencial operation thereof will be described below, referring to FIG. 6 which is a flow chart of the program for the overcurrent detector computer.

The electric current sensing means 1 senses the load current (Im) of an electric machine e.g. a motor, a generator etc., for example every 1 milli second by means of a sampling system (a).

The absolute value of the current is consecutively accumulated during the cumulative sampling period. The accumulation is conducted for a predetermined time or m times. In other words, the accumulation is continued until m times, e.g. 100 samplings, (100 milli seconds) are finished. Thereafter, the sum is divided by the number of the aforementioned sampling actions or m, e.g. 100, to obtain the average current (In) (aa).

Immediately after every average current (In) is calculated, the first calculation means 2 calculates the heat P(n) generated by the average current (In) during the predetermined cumulative sampling period, e.g. 100 milli seconds, by multiplying the square of the average current In calculated by the first calculation means 2 by the electric resistance r of the windings of the machine to be protected e.g. the motor, the generator or the like (b).

The second calculation means 4 conducts multiplication of the heat P(n) generated during a cumulative sampling period by the first coefficient $K_1$ and multiplication of the temperature rise $\theta(n-1)$ of the machine to be protected generated during the immediately preceding cumulative sampling period by the second coefficient $K_2$, and adds these two figures to obtain $\theta(n)$, before the value of $\theta(n)$ is memorized in the temperature rise memory means 3 (c).

Every calculation of the temperature rise $\theta(n)$ is followed by a comparison between the temperature rise $\theta(n)$ calculated by the second calculation means 4 and the maximum allowable temperature rise $\theta(max)$ (which is calculated by subtracting the ambient temperature from the temperature which potentially causes a damage by overheating), such comparison being conducted by the overcurrent detector means 5. Provided the temperature rise $\theta(n)$ calculated by the second calculation means 4 exceeds the maximum allowable temperature rise ($\theta(max)$), the overcurrent detector means 5 determines that the electric machine to be protected is in an overcurrent condition (d).

As described above, an overcurrent detector employing a computer is realized.

The foregoing description has clarified that this invention has successfully provided an overcurrent detector realized by employing a computer or an overcurrent detector realizing various advantages such as simplicity in construction, improvement in sensitivity and accuracy, such advantages being realized without being accompanied by any economical disadvantage, in the cases where a protected machine inherently employs a computer e.g. an automatic machine tool controled by numerical controlled system or the like.

Although this invention has been described with reference to specific embodiments, this description is not intended to be construed in a limiting sense to specific embodiments. Various other embodiments and/or modifications of this invention will become apparent to persons skilled in the art upon reference to the description of this invention. It is therefore contemplated that the claims will cover any such embodiments and/or modifications as they fall within the true scope of the invention.

We claim:

1. An overcurrent detector, comprising:
    an electric current sensing circuit for determining an instantaneous value of electric current (In) flowing in an electric machine sampled at successive time periods;
    first calculating means for receiving the instantaneous value from said electric current sensing circuit and for calculating heat (P(n)) generated in the electric machine based on the instantaneous value of the electric current (In) for each of the successive time periods and outputting the heat (P(n));

second calculating means for receiving the heat (P(n)) from said first calculating means and for calculating a temperature rise ($\theta(n)$) at a preset time period(N) according to:

$$\theta(n) = K_1 P(n) + K_2 \theta(n-1)$$

where
K$_1$ is a first coefficient,
K$_2$ is a second coefficient, and
$\theta(n-1)$ is a preceding temperature rise a preceding sampling period;
comparing means for comparing the temperature rise ($\theta(n)$) received from said second calculating means to a predetermined maximum allowable temperature rise ($\theta(max)$) to determine an overcurrent condition when the temperature rise ($\theta(n)$) is greater than the predetermined maximum allowable temperature rise ($\theta(max)$).

2. An overcurrent detector according to claim 1, wherein said first calculating means including multiplying means for multiplying a square of the instantaneous value of the electric current (In) by a resistance (r) of the electric machine.

3. An overcurrent detector according to claim 1, further comprising storing means for storing the preceding temperature rise ($\theta(n-1)$).

4. An overcurrent detector, comprising:
an electric current sensing circuit for determining an instantaneous value of electric current (In) flowing in an electric machine sampled at successive time periods;
average current calculating means for receiving the instantaneous value from said electric current sensing circuit and for determining an average value of the electric current (In) flowing in the electric machine at the successive time periods;
first calculating means for receiving the average value from said average current calculating means and for calculating heat (P(n)) generated in the electric machine based on the average value of the electric current (In) for each of the successive time periods and outputting the heat (P(n));
second calculating means for receiving the heat (P(n)) from said first calculating means and for calculating a temperature rise ($\theta(n)$) at a preset time period (N) according to:

$$\theta(n) = K_1 P(n) + K_2 \theta(n-1)$$

wherein
K$_1$ is a first coefficient,
K$_2$ is a second coefficient, and
$\theta(n-1)$ is a preceding temperature rise in a preceding sampling period;
comparing means for comparing the temperature rise ($\theta(n)$) received from said second calculating means to a predetermined maximum allowable temperature rise ($\theta(max)$) to determine an overcurrent condition when the temperature rise ($\theta(n)$) is greater than the predetermined maximum allowable temperature rise ($\theta(max)$).

5. An overcurrent detector according to claim 4,
wherein each of the successive time periods has a length, and
wherein the average value calculating means comprises:
dividing means for dividing each of the successive time periods by a number (m) to form a plurality of subdivisions;
determining means for determining an instantaneous value of the electric current for each of the plurality of subdivisions; and
summing means for summing absolute values of each instantaneous value and dividing by (m) to derive the average value of the electric current.

* * * * *